(12) United States Patent
Rovira

(10) Patent No.: US 6,652,690 B1
(45) Date of Patent: Nov. 25, 2003

(54) SYSTEM FOR PROVIDING HEATED FLUID UTILIZING EXOTHERMIC CHEMICAL REACTION FOR CURING RESIN IN PIPE LINER/REPAIR PROCESS

(76) Inventor: Dwayne Rovira, 42305 S. Airport Rd., Hammond, LA (US) 70403

( * ) Notice: Subject to any disclaimer, the term of this patent is extended or adjusted under 35 U.S.C. 154(b) by 141 days.

(21) Appl. No.: 09/799,904

(22) Filed: Mar. 6, 2001

(51) Int. Cl.[7] .............................................. B29C 63/28
(52) U.S. Cl. ...................... 156/94; 126/263.05; 138/97; 138/98; 156/156; 156/294; 264/36.17; 264/269
(58) Field of Search .......................... 156/94, 156, 287, 156/294; 264/36.17, 36.22, 269; 138/97, 98; 126/263.05

(56) References Cited

U.S. PATENT DOCUMENTS

| | | | |
|---|---|---|---|
| 266,369 A | | 10/1882 | Jenkins |
| 1,384,747 A | | 7/1921 | Eckelmann et al. |
| 1,850,166 A | | 3/1932 | Bell |
| 3,307,997 A | | 3/1967 | Detrick |
| 3,429,672 A | | 2/1969 | Young |
| 3,663,335 A | | 5/1972 | Sheedy |
| 3,766,079 A | | 10/1973 | Jackman et al. |
| 3,884,216 A | | 5/1975 | McCartney |
| 4,135,958 A | | 1/1979 | Wood |
| 4,142,508 A | | 3/1979 | Watson |
| 4,430,988 A | | 2/1984 | Krasberg |
| 4,573,447 A | | 3/1986 | Thrash et al. |
| 5,322,653 A | * | 6/1994 | Muller |
| 5,487,411 A | * | 1/1996 | Goncalves |
| 5,628,345 A | * | 5/1997 | Fisco |
| 5,687,706 A | | 11/1997 | Goswami et al. |
| 5,937,910 A | | 8/1999 | Chandler |
| 6,401,815 B1 | * | 6/2002 | Surjaatmadja et al. |

FOREIGN PATENT DOCUMENTS

GB         2113608         * 8/1983

* cited by examiner

Primary Examiner—Steven D. Maki
(74) Attorney, Agent, or Firm—Joseph T Regard ltd

(57) ABSTRACT

A "chemical heater" in the form of a cartridge containing an exothermic agent such as sodium hydroxide (caustic) soda, or the like, which, when infused into water, releases heat in the form of an exothermic reaction. In the preferred embodiment of the invention, a cartridge is provided which contains the exothermic material. Water or the like is then directed through said cartridge so that the exothermic material dissolves, providing a solution of water infused with the exothermic material. The solution is heated by virtue of the exothermic reaction, said solution passing out of the cartridge and into a bladder located in a pipe, filling same. Situated about the bladder is a patch or sleeve of material including heat cured resin, which is urged to line the pipe by virtue of the bladder inflating, while simultaneously heated to cure same by virtue of the heated solution. Upon curing of the resin, the bladder is deflated and the fluid drained or otherwise disposed of, with the cured resin sleeve or patch remaining in place lining the pipe. The bladder may then be removed. An alternative design of the invention teaches a bladder configured to receive the exothermic material, allowing the bladder to inflate and provide an exothermically heated solution to heat the bladder simultaneously.

7 Claims, 5 Drawing Sheets

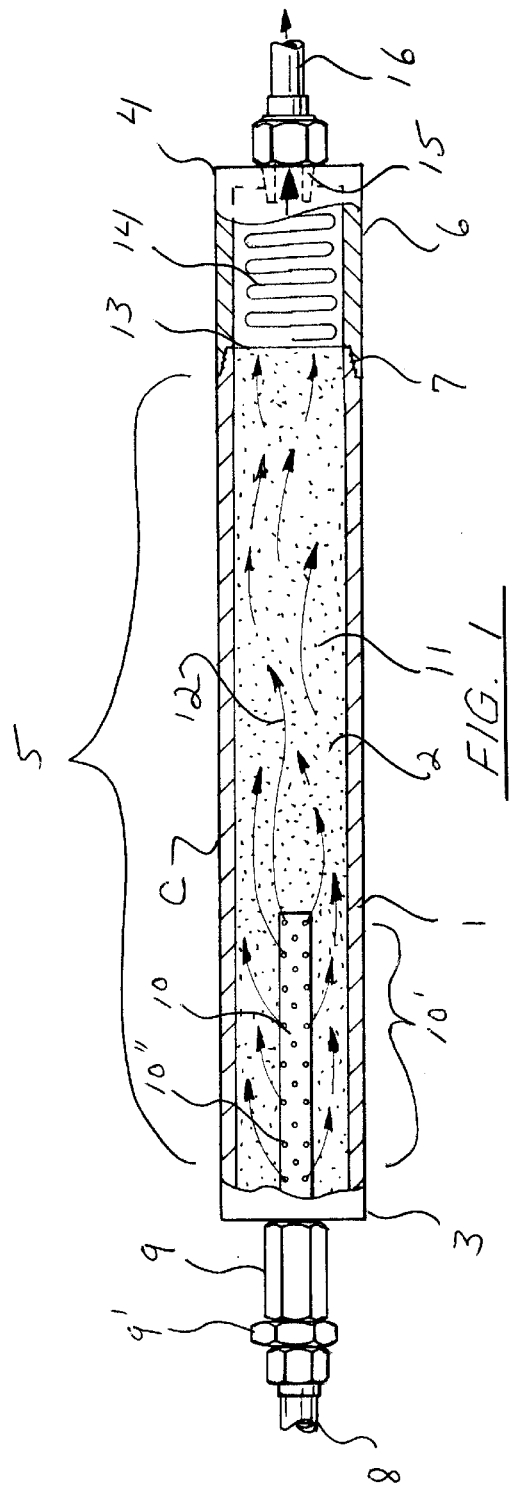
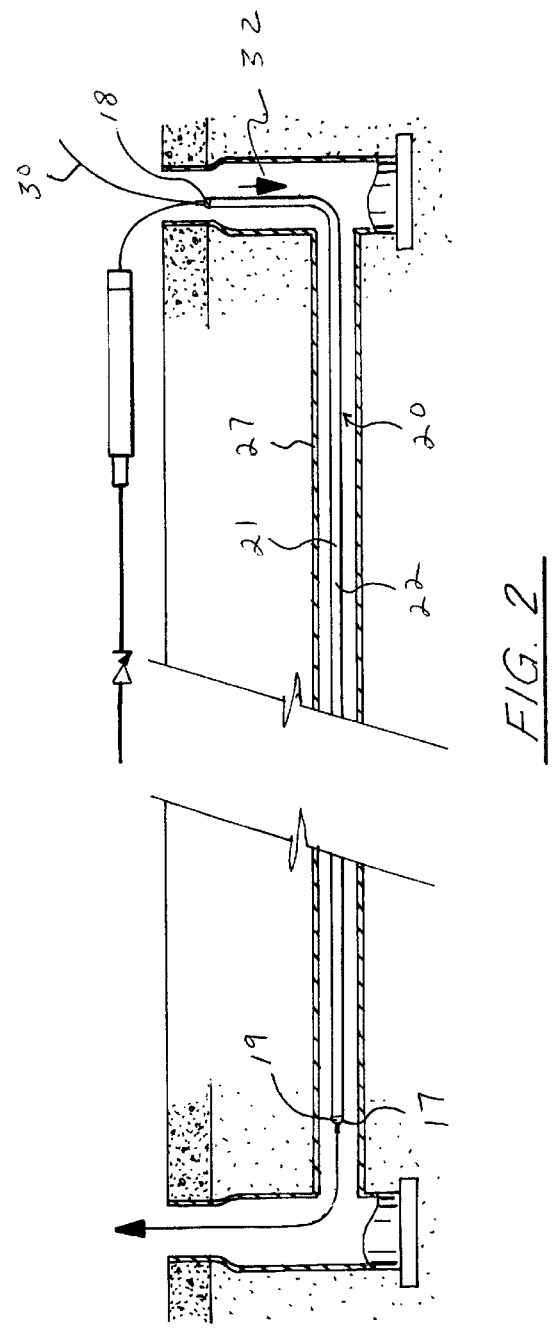
FIG. 1
FIG. 2

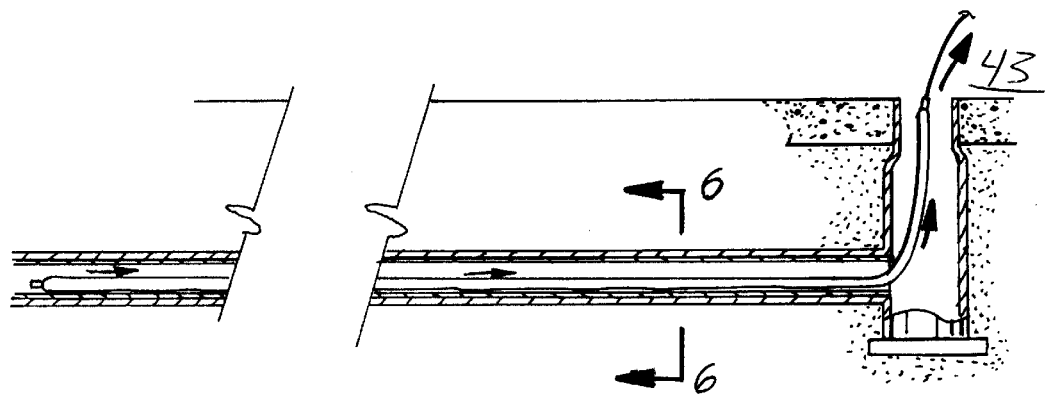
FIG. 5
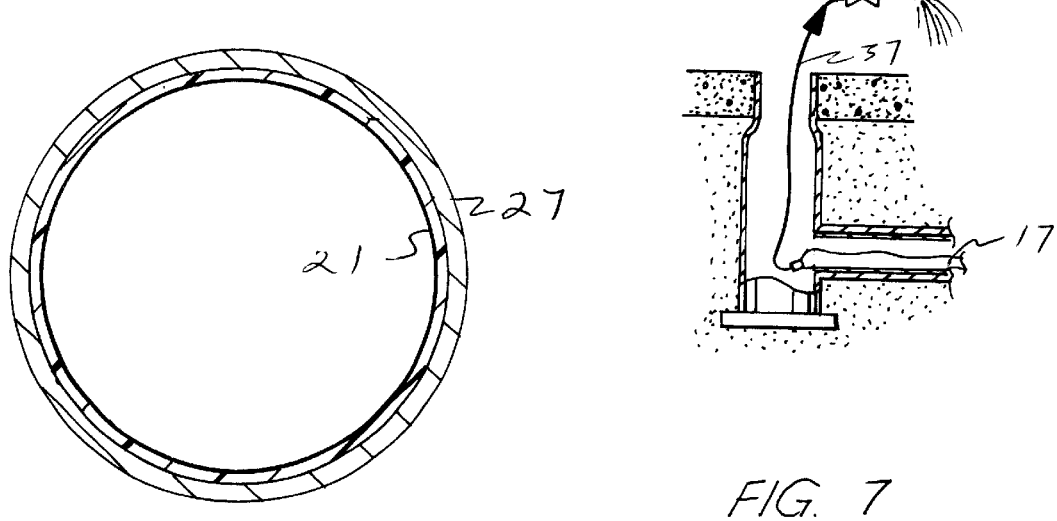
FIG. 8
FIG. 7

SYSTEM FOR PROVIDING HEATED FLUID UTILIZING EXOTHERMIC CHEMICAL REACTION FOR CURING RESIN IN PIPE LINER/REPAIR PROCESS

TECHNICAL FIELD OF THE INVENTION

The present invention relates to systems for providing heated fluids, and in particular to an exothermic fluid heater for utilization with in-situ lining or patching of pipes or the like. The preferred embodiment of the present invention utilizes a "chemical heater" in the form of a cartridge containing an exothermic agent such as sodium hydroxide (caustic) soda, or the like, which, when infused into water, releases heat in the form of an exothermic reaction.

In the preferred embodiment of the invention, a cartridge is provided which contains the exothermic material. Water or the like is then directed through said cartridge so that the exothermic material dissolves, providing a solution of water infused with the exothermic material. The solution is heated by virtue of the exothermic reaction, said solution passing out of the cartridge and into a bladder located in a pipe, filling same. Situated about the bladder is a patch or sleeve of material including heat cured resin, which is urged to line the pipe by virtue of the bladder inflating, while simultaneously heated to cure same by virtue of the heated solution.

Upon curing of the resin, the bladder is deflated and the fluid drained or otherwise disposed of, with the cured resin sleeve or patch remaining in place lining the pipe. The bladder may then be removed.

While the exemplary embodiment of the present invention illustrates the use of sodium hydroxide as the exothermic material, it is noted that other materials may likewise be utilized with satisfactory results. Further, the exothermic reaction may be enhanced via the use of a catalyst such as aluminum or other metal or material.

BACKGROUND OF THE INVENTION

It has been known that combining certain compositions, including sodium hydroxide and water, can cause an exothermic reaction which creates heat. In the many applications, exothermically created heat is often an undesirable byproduct; nonetheless, there is prior art which teaches the utilization of exothermically created heat to provide a chemical heater. However, the known prior art uses do not contemplate, suggest, or otherwise teach the system of the present invention.

A list of patents which may have some pertinence to the present invention include:

| Patent Number | Inventor | Date of Issue |
| --- | --- | --- |
| 266369 | Jenkins | Oct. 24, 1882 |
| 1384747 | Eckelmann | Jul. 19, 1921 |
| 1850166 | Bell | Mar. 22, 1932 |
| 3429672 | Young | Feb. 25, 1969 |
| 3663335 | Sheedy | May 16, 1972 |
| 3766079 | Jackmann | Oct. 16, 1973 |
| 3884216 | McCartney | May 20, 1975 |
| 4142508 | Watson | Mar. 06, 1979 |
| 4135958 | Wood | Jan. 23, 1979 |
| 4430988 | Krasberg | Feb. 14, 1984 |
| 4573447 | Thrash et al | Mar. 04, 1986 |
| 5678706 | Goswami et al | Nov. 18, 1997 |
| 5937910 | Chandler | Aug. 17, 1999 |

In current, known inversion methods of lining or spot repairing of pipe, a thermosetting resin-impregnated sleeve is situated about a generally cylindrical bladder, which bladder is filled with a fluid such as water to urge the sleeve about the inner diameter of the pipe to be lined or patched. As the resin is cured via thermal energy, it is often necessary to utilized heated water to fill the bladder, the heat of the water also curing the resin. In past methods, the fluid filling the bladder is heated via a boiler, furnace or the like to provide the thermal energy to cure the resin. Alternatively, infra red heaters, (U.S. Pat. No. 4,135,958), UV, and U.S. Pat. No. 5,937,910 teaches ultrasonic energy to cure the resin.

U.S. Pat. Nos. 3,663,335 and 3,307,997 teach the utilization of combustible fuel elements to heat an adhesive for joining pipes.

U.S. Pat. No. 4,430,988 teaches the use of sodium hydroxide as an exothermic heater agent, enhanced with aluminum ingots, for providing heated fluid for heating a diver under water.

U.S. Pat. No. 4,573,447 teaches a "Chemical Heater" utilizing sodium hypochlorite to heat a pad for warming a user.

The utilization of boilers, furnaces, infrared heaters, ultrasonic energy devices or the like to heat the thermosetting resin in pipe lining processes requires expensive equipment which may require training to operate, or may be dangerous or only be utilized with predetermined installations. What is not shown in the prior art is a system for heating thermosetting resin in situ within a pipeline, which is relatively inexpensive to implement and utilize, and which is flexible as to the circumstances of use.

GENERAL SUMMARY DISCUSSION OF THE INVENTION

The present invention contemplates a system for heating fluid utilized in the curing of resin in lining a pipe, which is more cost effective, faster, and easier to implement.

The present invention comprises a system for heating water to cure a resin impregnated liner or patch for lining or patching a pipe in situ, utilizing a chemical heater in the form of a cartridge containing an exothermic agent, such as sodium hydroxide (caustic soda) or some other substance which, when mixed with water or another fluid, releases heat, providing a heated solution. The heated solution is then directed to a bladder having a heat-cured resin impregnated liner situated thereabout, which bladder is then filled with the heated solution to urge the liner about the inner diameter of a pipeline, so as to position the liner and heat same to cure the resin. Once cured, the liner hardens to form a ridged inner wall of the pipe.

The current working embodiment of the invention utilizes a cartridge formed of PVC pipe having first and second ends and a chamber formed therein, the pipe three inches in diameter and about 32 inches long. Attached to the first end is a water hose, which engages a check valve at the unit. From the check valve, the inside of the unit contains about a ¼" pipe, about 14 inches long, which has ⅛" flow apertures formed along its length. The second end of the cartridge comprises a cap about 5" long which is threadingly attached to the first end. The second end of the unit has situated therein has a metal sieve with a filtering agent such as cheesecloth, the second end having emanating therefrom a hose connection which engages a hose which runs to a cylindrical bladder, for example, eight inches in diameter, about four feet long, which bladder has a drainage hose emanating from the opposite end.

In use, the bladder has removably placed thereupon a resin impregnated sleeve (of thermosetting resin), of felt or the like. Alternatively, a patch may be utilized in lieu of a sleeve. The bladder and sleeve (or patch) are placed within a pipeline at the desired position to repair or line the pipe. The cartridge is filled with caustic soda (sodium hydroxide) or some other exothermic composition. Water or some other fluid is then urged into the first end of the cartridge, which passes into the cartridge via the inner pipe, dissolving the sodium hydroxide, which dissolved solution passes through the sieve and filtering medium (cheesecloth), and into the bladder so as to inflate same.

In the exemplary bladder, it would take around fifteen gallons to inflate same. The solution becomes heated due to exothermic energy, which heat is retained by the water for several hours; as the resin is heat cured, the sleeve begins to harden with the bladder in its inflated state, urging the sleeve (or patch) against the inner wall of the pipe. After the resin has cured, the water is drained from the bladder via the drain hose, and the bladder pulled out, leaving the repaired pipe with the sleeve intact.

In the above example, two pounds of caustic soda (99% sodium hydroxide) is utilized per gallon of water, creating an exothermic heat of about 122 degrees Fahrenheit, although the temperature can be vary significantly with different concentrations. The use of other compositions, or the addition of other materials, such as, for example, aluminum, can increase the heat reaction.

It is therefore an object of the present invention to provide a method of lining or repairing passageways utilizing a chemical heater.

It is another object of the present invention to provide a system for curing thermosetting resin utilizing an exothermic reaction.

It is another object of the present invention to provide a cartridge system for mixing and forming an exothermic heater solution.

It is another object of the present invention to provide a method of lining pipe utilizing a cartridge system for providing a heated solution for inflating the bladder, so as to position a resin impregnated liner or patch, while heat curing the liner or patch with said heated solution.

Lastly, it is an object of the present invention to provide a method and system for lining passageways utilizing an exothermic cartridge heater system.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 1 is a side, partially cut-away view of the cartridge of the present invention, illustrating fluid flow through exothermic material, and dilution of same to form a heated solution passing through the unit.

FIG. 2 is a side, partially cross-sectional view the invention of FIG. 1, illustrating an exemplary embodiment of the present system utilized to cure a manhole to manhole liner installation.

FIG. 5 illustrates the invention of FIG. 4, wherein the bladder has been drained and being removed from the lined pipe.

FIG. 7 is a side, partially cut-away view of the invention of FIG. 6, illustrating draining of the solution from the bladder.

FIG. 8 is a lateral, cross-sectional view of the invention of FIG. 7, illustrating the lined pipe.

DETAILED DISCUSSION OF THE INVENTION

Figure 3:
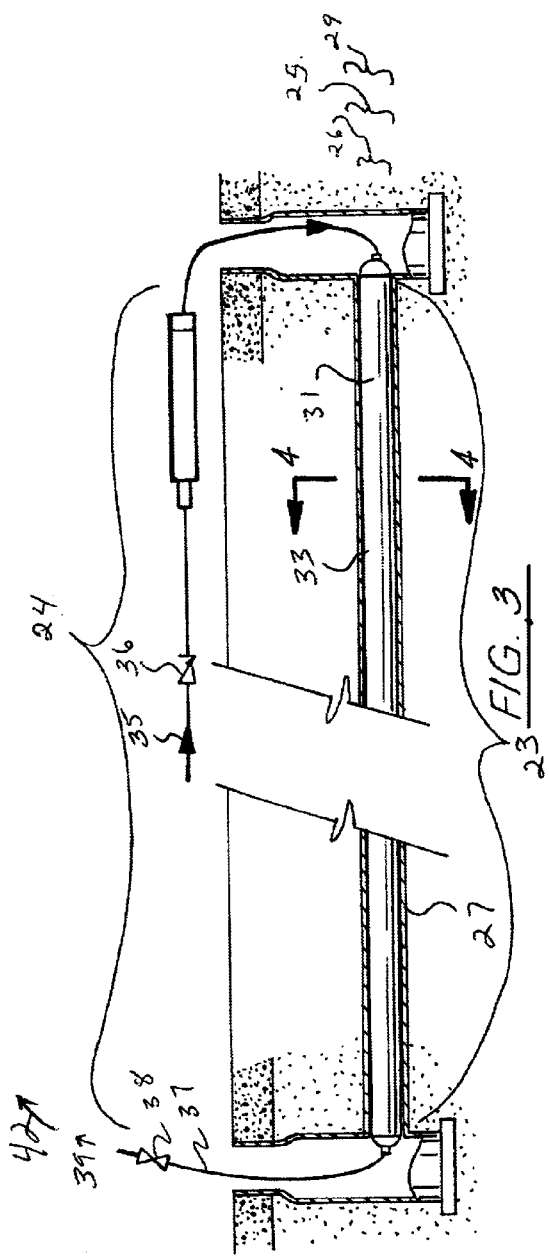
FIG. 3 is a side, partially cross-sectional view of the invention of FIG. 2, illustrating lining of the pipeline.
Figure 6:
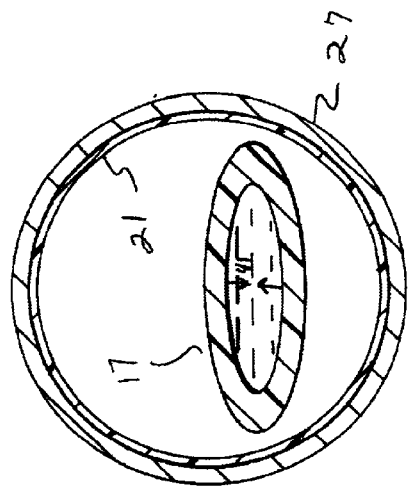
FIG. 6 illustrates the invention of FIG. 5, illustrating a lateral, cross-sectional view of the lined pipe with the partially deflated bladder situated therein.
Figure 4:
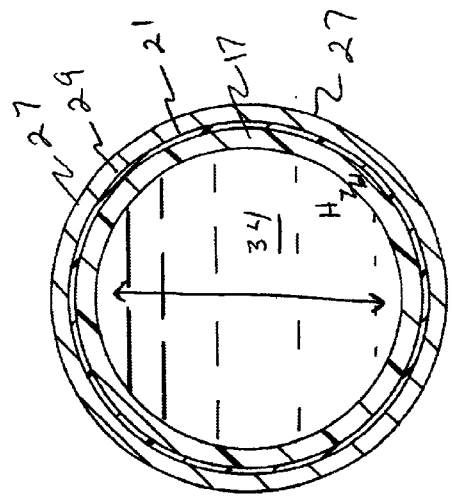
FIG. 4 is a lateral, cross-sectional view of the invention of FIG. 3, illustrating heated solution having filled the bladder, pressing the liner against the interior of the pipe to be lined, the heated solution curing the liner in place.

Referring to FIG. 1 of the drawings, the preferred embodiment of the present invention utilizes a cartridge C having a body 1 having an enclosed, longitudinally situated compartment 2 situated therein, the body having first 3 and second 4 ends, the compartment forming a material containment area 5 accessible via a threadingly 7 affixed cap 6, port, or the like.

The cartridge has associated with the first end 3 a hose coupling 9' which may include a check valve 9, the coupling communicating with an infusing pipe 10 situated within the material containment area 5, the infusing pipe having a length 10' and multiple apertures 10" formed therethrough for dispersing fluid into the material containment area 5. A fluid source hose 8 communicates with hose coupling 9', which leads to the infusing pipe 10.

Situated within the containment area adjacent to the second 4 end of the body is screen 13 and/or filter material 14 or sieve of, for example, cheesecloth or the like to prevent passage of solids through exit port 15. Communicating with exit port 15 via hose coupling or the like is solution hose 16.

Continuing with FIGS. 1–4 and 7, the cartridge C of the present invention is configured to be utilized in conjunction with lining or patching of pipe 27, wherein there is provided a bladder 17 having first 18 and second 19 ends and a passage 20 therebetween, the bladder formed of a fluid impermeable, flexible, collapsible and inflatable material, the bladder configured to receive about it a liner 21 of material for affecting the repair of the pipe, typically infused with a thermally cured resin 22. The liner is generally slid over the bladder to envelope same, the bladder having a length 24 generally about equal to or greater than the length 23 of the liner, with the liner having a diameter 26 configured to engage the inner diameter 29 of the pipe to be lined when the bladder is inflated, the bladder having a diameter 25 equal to or greater than that of the liner.

In use, the size of the pipe to be lined (or size of patch) to is first determined (which is used to discern the length and diameter of the bladder and liner) and the gallons of fluid (generally water) required to fill the bladder is then calculated. The ambient temperature of the working environment within the pipeline may also be considered in discerning the amount of exothermic material to place in the cartridge. Utilizing caustic soda or sodium hydroxide as the exothermic material, one may utilize, for example, 2 pounds of caustic soda for every gallon of water going into the bladder in order to raise the temperature of the water from about 60 degrees F. to about 110 degrees F. Three pounds per gallon of water may be used to further increase the temperature, and speed up the curing process.

In the present example, 99% caustic soda pellets are placed into the material containment area 5 of the cartridge C. Once the liner (or patch) and bladder have been positioned 32 within the pipe, an air hose may be utilized to inflate 31 the bladder with air (for example, about 10 psi), so as to position the liner adjacent to 33 the inner diameter of the pipe. This step of pre-inflating the bladder with air may not be necessary, depending upon the circumstances of use.

With the liner and bladder situated within the pipeline, and the cartridge loaded with the exothermic agent (in this case, caustic soda or sodium hydroxide), valve 36 to urge water 35 urged into the containment area 5 of the cartridge C via hose 8, which water is dispensed into the containment area by passing through apertures 10" in infusing pipe 10, the water then dissolving the material 11 forming a liquid solution 12 which is urged through screed 13 and filtering material 14 or media, through exit port 15 and into solution hose 16, where the solution is directed to bladder 17, filling 34 and warming same, so as to heat and urge the resin infused liner 21 firmly against the inner wall 29 of pipe 27, the heat H from the solution passing through the liner 17 so as to heat and thermally cure the resin in the liner, causing the liner to adhere to the inner wall 29 of the pipe and to harden and solidify. Where the bladder is pre-filled with air to position the liner, the air should be drained 39 by opening valve 36, and allowing air displaced by the solution flowing into the bladder to escape via hose 37. Care must be taken to insure all of the air is removed from the bladder if this step is used, as remaining air will displace the heated solution, resulting in uneven heating. Other scenarios may involve no pre-filling with the bladder with air, and may even involve pulling a vacuum on the bladder prior to filling with the solution to insure that there is no air trapped in the bladder. Still another scenario could involve pre-filling with air then releasing out the air and pulling a vacuum prior to filling the bladder with the solution.

It is reiterated that care should be taken to insure that all of the air is drained from the bladder by fully filling the bladder with the heated solution, to insure uniform heating of the liner by said solution. When the air has completed its migration from the bladder and water begins to flow from the drainage hose 37, valve 38 should be shut. Upon filling of the bladder with the heated solution to, for example, 40 psi, valve 36 should be closed to cease the flow of further fluid, and the heated, fluid filled bladder and liner in the pipe should be allowed to sit for a predetermined time to allow the heated liner to cure in place so as to line the pipe.

After allowing the heated bladder to cure the liner in place, for example, about 2 hours utilizing polyester, vinyl ester, epoxy or other thermosetting resin with a suitable activator, as is well known in the art at an exothermically generated temperature of, for example, 125 degrees F. (perhaps more or less, depending upon the resin and environmental factors), the solution is drained 42 via hose 37. Where permissible, the fluid may be drained directly into the pipe that has been lined. Further, if it is necessary to adjust the PH or alkalinity of the solution to a more neutral value for disposal purposes, or to comply with disposal regulations, a neutralizing agent such as acetic, citric, or phosporic acid may be added to the drained solution before disposal. Further, the neutralizing agent may be added by placing such a neutralizing agent into the cartridge C material containment area 5 and flowing water through same via hose 8 to create a neutralizing solution which would flow into the bladder or other container, so as to mix same with the earlier formed, heated solution, neutralizing same for disposal purposes, and permitting safe disposal on site.

Continuing with FIGS. 5, 6, 7, and 8, draining the fluid from the bladder causes it to deflate 41, allowing removal 43 of same and leaving the cured, solidified liner 21 intact enveloping the inner diameter of the pipe 27, effectively lining same.

Figure 9:
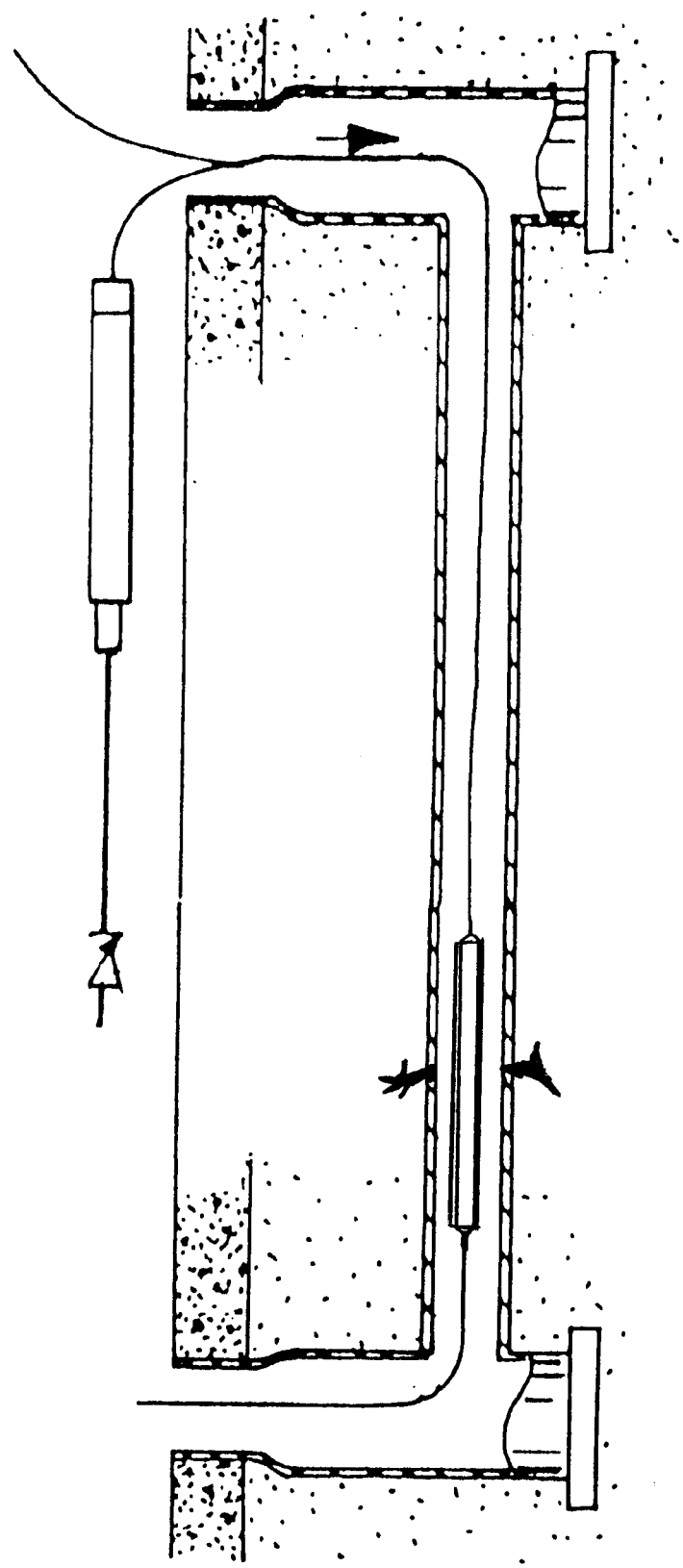
FIG. 9 is a side, partially cut-away view of the invention of FIG. 1, illustrating a spot repair of pipe as opposed to the manhole to manhole installation of FIG. 2.

FIG. 9 illustrates an alternative embodiment of the present invention, wherein there is provided a shortened system of that illustrated in FIGS. 1–8 for purposes of effecting a spot repair in an existing pipeline. Other than the shortened length of the bladder and liner, and lessened amount of water necessary to fill the bladder and commensurate lessened amount of exothermic material required to effectuate the thermal reaction, the system would be similarly implemented. While the system shown in FIG. 9 illustrates a shortened sleeve, a spot repair may be effectuated with a patch other than a sleeve removably affixed to the bladder, such as a circular, rectangular, square or other patch configuration. Further, it is noted that the bladder need not be cylindrical in configuration for patching of pipes, and may be circular, square, oval, egg-shaped or rectangular in configuration, for example, depending upon the type and size of patch being affixed.

Also, it is noted that the size and configuration of the cartridge, exothermic material utilized, material amounts and time factors are for exemplary purposes only and not intended to limit the scope of the claims.

Figure 10:
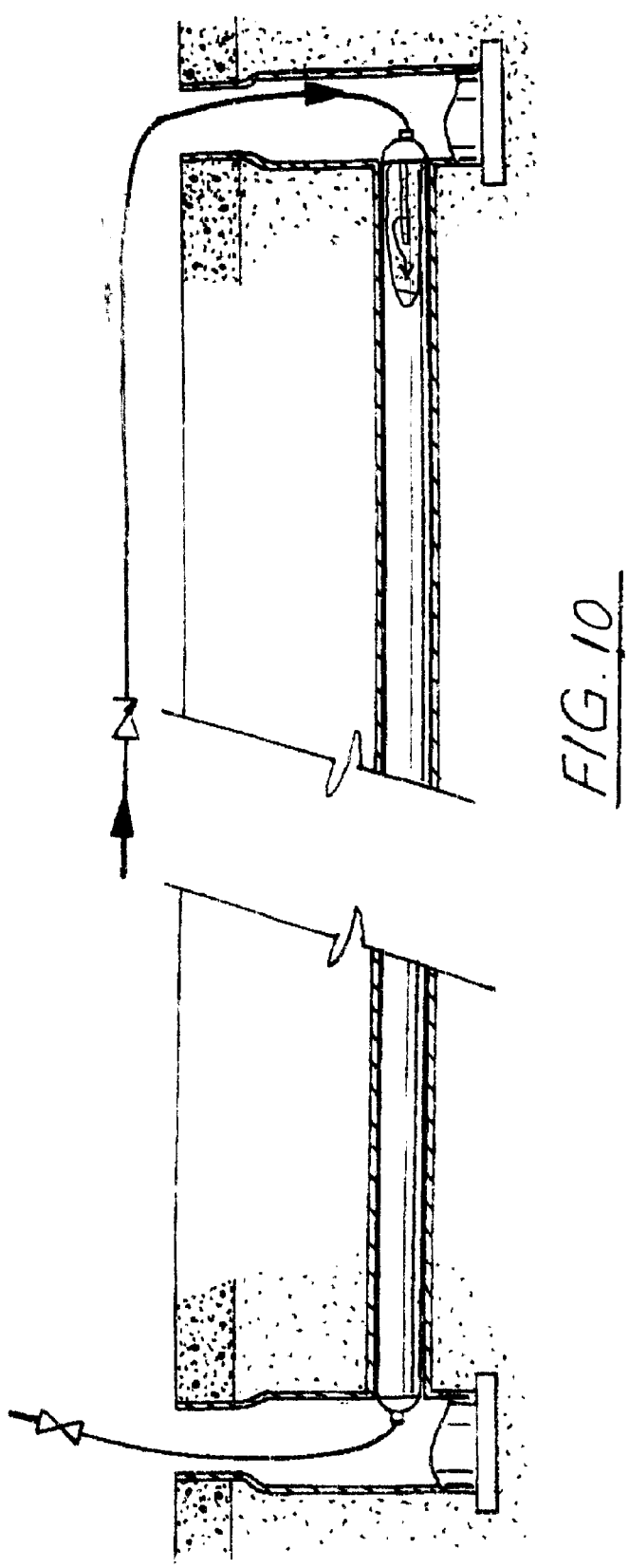
FIG. 10 is a side, partially cutaway view of an alternative embodiment of the present invention, illustrating a bladder having a liner situated thereabout within a pipeline, the bladder configured to contain and receive the exothermic material, and receive a flow of water therein to inflate the bladder, and mix the exothermic material with the water to form the heated solution, to simultaneously provide a heated, inflated bladder.

Referring now to FIG. 10, a second alternative embodiment of the present invention illustrates that the bladder can serve the dual function as the inflator and the container/mixing area for the exothermic material. As shown, a bladder having first and second ends, and a passage therebetween, is provided, the first end having a fluid inflow port, the second end having a fluid outflow port, although one hose connection may be utilized if required.

Situated within the passage contained by the bladder, is an exothermic material such as caustic soda, in a pre-calculated amount to provided the necessary exothermic heat for curing the resin, which amount varies depending upon environmental criteria including temperature, the amount of water required to fill the bladder, the concentration of the exothermic material used, etc.

A diffusion pipe may be provided from the inlet port to facilitate mixing and dilution of the water with the exothermic material when in use, to form the heating solution. A screen or other fluid permeable containment means may be provided to compartmentalize the exothermic material in a particular section of the bladder until it is dissolved.

Upon fluid flow via a hose or the like, the water passes through the diffusion pipe, into the exothermic material, forming a heated solution which passes through the screen, heating the bladder while simultaneously filling same. When the bladder is filled, it is also heated by the exothermic reaction, thereby simultaneously positioning and heating the liner for curing same against the inside wall of the pipe to be repaired.

Utilizing this second alternative method may thereby be summarized as follows:

a. providing a bladder having first and second ends, and a passage therebetween;

b. placing a quantity of exothermic material into said bladder;

c. providing a flow of water into said bladder, mixing said water with said exothermic material, and allowing an exothermic reaction caused by the mixing of said exothermic material with said water to create heat, providing a heated solution;

d. allowing said heated solution to heat said bladder, providing a heated bladder, while allowing said flow of water to inflate said bladder, providing an inflated bladder;

e. allowing said inflated bladder to position a thermosetting material against the inside wall of a pipe, and allowing said heated bladder to cure said thermosetting material.

As with the earlier embodiments, it may be necessary to neutralize the solution via acetic acid or the like prior to draining the solution into a municipal sewer or the like.

Lastly, while the present embodiments were shown lining horizontally situated passages in the form of pipes, other types of passages could be similarly lined, and said passages may be laterally situated to a main passage, or may be above ground.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. The method of lining a passage having an inner wall in the ground utilizing a bladder having an intake hose and a resin infused patch situated about said bladder within said passage, comprising the steps of:

a. providing a container having an exothermic material situated therein, the container having an exit port communicating with the intake hose of the bladder;

b. providing a flow of fluid through said container, so as to dissolve said exothermic material with said fluid, so as to provide an exothermically heated solution;

c. directing said exothermically heated solution through said intake hose and into the bladder, so as to fill the bladder with said exothermically heated solution, providing a filled bladder;

d. allowing said filled bladder to force said resin infused patch to said inner wall of said passage; while e. allowing said exothermically heated solution to heat and thermoset said resin.

2. The method of claim 1, wherein said exothermically heated solution has an alkalinity, and wherein there is included after step "e" the additional step "f" of adjusting the alkalinity of said exothermically heated solution, providing a neutralized solution, and draining said neutralized solution.

3. The method of claim 2, wherein step "b" further includes the step of filtering particulates from said exothermically heated solution, providing a filtered, exothermically heated solution, and wherein in step "c" there is further provided the step of directing said filtered, exothermically heated solution through said intake hose into said bladder, so as to inflate said bladder with said filtered, exothermically heated solution.

4. The method of remediating a passage, comprising the steps of:

a. providing a cartridge having first and second ends, and a material containment area situated therebetween, said containment area comprising filtering means for filtering particulates;

b. placing a quantity of exothermic material into said material containment area of said cartridge;

c. providing a flow of water into said material containment area of said cartridge, so as to mix said water with said exothermic material, allowing an exothermic reaction caused by the mixing of said exothermic material with said water to create heat, providing a heated solution;

d. directing said heated solution through said containment area, providing a heated, filtered solution, then directing said heated, filtered solution through an intake hose into a bladder situated in a passage, so as to provide a heated bladder;

e. allowing said inflated, heated bladder to position a thermosetting material against the inside wall of said passage, and allowing heat from said bladder to cure said thermosetting material.

5. The method of claim 4, wherein said exothermic material is caustic soda, and wherein there is further provided the step "f" after step "e" of adjusting the alkalinity of said heated solution so as to form a neutralized solution, and draining said neutralized solution.

6. The method of claim 4, wherein in step "f" there is further provided the step of placing a quantity of alkalinity adjusting material in said material containment area of said cartridge, and step "g" of providing a flow of water into said material containment area of said cartridge, and mixing said water with said alkalinity adjusting material, forming an alkalinity adjusting solution, and mixing said alkalinity adjusting solution with said heated solution so as to form a neutralized solution.

7. The method of remediating a passage, comprising the steps of:

a. providing a bladder having an intake port, first and second ends, and a passage therebetween;

b. providing a cartridge having first and second ends, and an exothermic material containment area therebetween, said first end of said cartridge having a fluid inflow port, said fluid inflow port directing fluid to an infusing pipe situated within said exothermic material containment area, said infusing pipe having formed therein a plurality of fluid flow apertures for infusing water into said exothermic material containment area;
   an outflow port; and
   filtering means for preventing the flow of solids through said outflow port;

c. placing a quantity of exothermic material into said exothermic material containment area of said cartridge;

d. providing a flow of water into said cartridge, mixing said water with said exothermic material, and allowing an exothermic reaction caused by the mixing of said exothermic material with said water to create heat, providing a heated solution;

e. allowing said filtering means to filter said heated solution, providing a filtered, heated solution, and directing said filtered heated solution through the intake port of the bladder so as to heat said bladder, providing a heated bladder, while allowing said flow of water to inflate said bladder, providing an inflated bladder;

f. allowing said inflated bladder to position a thermosetting material against the inside wall of a passage, and allowing said heated bladder to cure said thermosetting material.

\* \* \* \* \*